May 25, 1965  J. L. JEANNERET  3,185,003
MACHINE-TOOLS FOR COPYING
Filed March 29, 1961  2 Sheets-Sheet 1
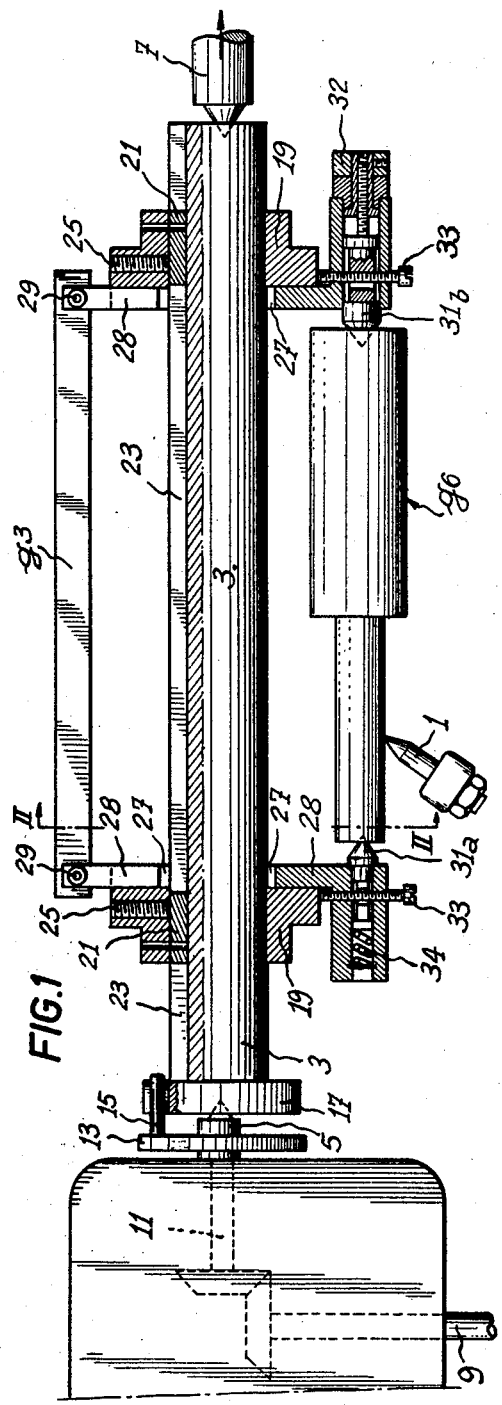
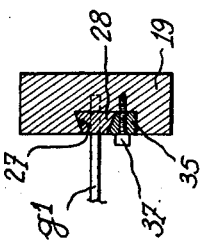
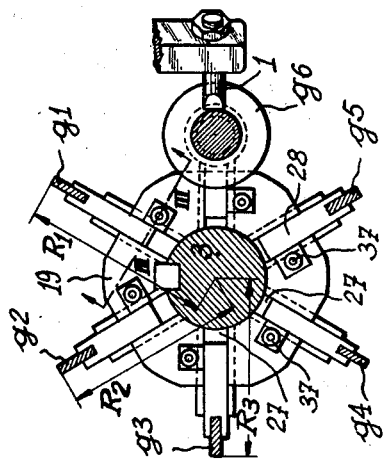

May 25, 1965  J. L. JEANNERET  3,185,003
MACHINE-TOOLS FOR COPYING
Filed March 29, 1961  2 Sheets-Sheet 2
FIG.5  FIG.4
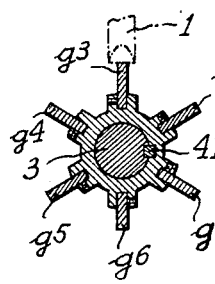 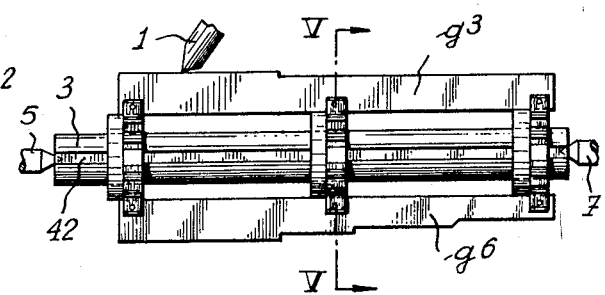
FIG.7  FIG.6
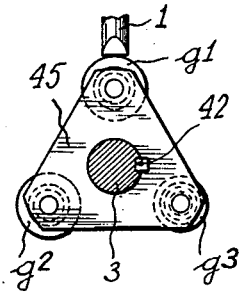 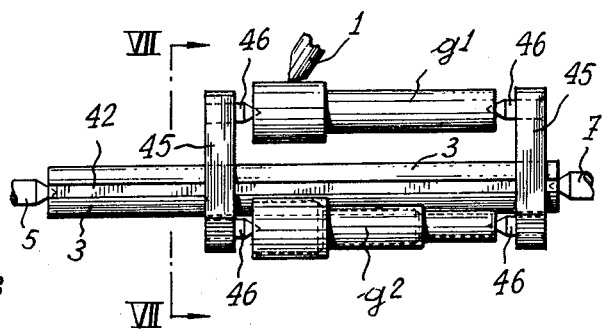
FIG.9  FIG.8
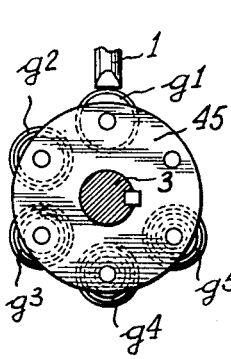 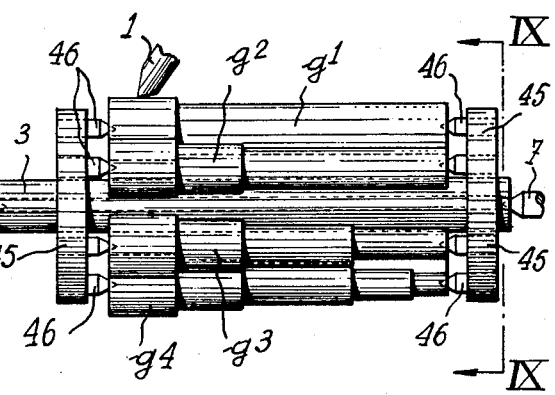

United States Patent Office 3,185,003
Patented May 25, 1965

3,185,003
MACHINE-TOOLS FOR COPYING
Jules Louis Jeanneret, 13–21 Rue H. Gelin,
Niort, Deux-Sevres, France
Filed Mar. 29, 1961, Ser. No. 99,282
4 Claims. (Cl. 82—14)

In general, the present invention relates to machine-tools for copying, wherein a feeler connected for movement with the tool successively follows the profiles of a plurality of templates in such fashion as to control automatically the machining of a workpiece in a plurality of successive stages.

More particularly the present invention has for an object the provision of a rotary template-holder which is driven step by step, each step corresponding to one machining stage, characterised in that the template-holder comprises, in combination, a rotating shaft, means for rotating this shaft step by step, at least two cheeks mounted perpendicularly on the rotary shaft, and a plurality of template-support assemblies mounted on the cheeks in such fashion as to be situated in planes passing through the axis of the rotary shaft, and regularly spaced angularly, each assembly of template-supports being intended for the mounting of a detachable template upon the template-holder.

According to one characteristic feature of the invention the template-holder comprises two cheeks mounted in sliding fashion on the rotary shaft and locking means for these cheeks on the rotary shaft, so that the spacing of the two cheeks can be regulated.

According to another characteristic feature the template-support assemblies on the cheeks are regulable radially on these cheeks.

Furthermore these template-supports are designed, according to choice, so that they may be able to receive templates which may be constituted by rulers, plane profile templates, or model workpieces, it being possible for these different kinds of templates to be used in any combination.

The characteristics of the invention and its advantages will be better understood with the aid of the following description of particular forms of embodiment of the invention, given solely by way of example.

Reference will be made to the accompanying drawing wherein:

FIGURE 1 is a view from above, partially in section, of a template-holder in accordance with the invention.

FIGURE 2 is a view in section on the plane II—II indicated in FIGURE 1, and

FIGURE 3 is a view in section on the plane III—III indicated in FIGURE 2.

FIGURE 4 is an elevational view of another template-holder intended to support only plane templates.

FIGURE 5 is a view in section through V—V in FIGURE 4.

FIGURE 6 is an elevational view of a template-support intended to support only model workpieces.

FIGURE 7 is a view in section on the plane VII—VII indicated in FIGURE 6, and

FIGURES 8 and 9 represent, in elevation and in section respectively, a template-holder supporting six model workpieces.

As stated above, the template-holder as represented in FIGURE 1 is intended to be mounted on a copying machine-tool, such as a copying lathe, wherein a feeler 1, fixed in relation to the movement with the cutting tool in known manner, successively follows the profiles of a plurality of templates $g1$, $g2$, $g3$, $g4$, $g5$ and $g6$, in such fashion as to control automatically the machining of a workpiece in six successive stages.

The template-holder comprises a rotatable shaft 3 mounted between two centers 5 and 7, the center 7 being capable of moving away from the center 5 so that the shaft 3 can be placed in position or removed. In FIGURE 1 only shafts 9 and 11 are represented, driven in step-by-step rotary movement in the operation of the machine-tool, each step corresponding to a machining stage. The shaft 11, which terminates in the center 5, is secured for rotation with a crown 13 which is coupled through a dog 15 with a crown 17 secured with the shaft 3.

Two cheeks 19 are are mounted perpendicularly on the shaft 3. These cheeks each have a central circular opening so that they can slide along the shaft 3. They are placed in correct angular position with the aid of keys 21, guided in a channel 23 of the shaft 3. Finally they are locked in a selected longitudinal position by screws 25. Thus the spacing of the two cheeks 19 can be regulated.

Six dovetail slideways 27 are provided radially in the cheeks 19. Template supports 28 are mounted slidably in these slideways.

In the case of the templates $g1$ to $g5$, the ends of these supports 28 are adapted for the mounting of templates which are constituted by rules or plane profile templates, these templates being accommodated in slots formed at the ends of the supports 28 and being locked by screws 29.

In the case of the template $g6$, which is constituted by a model workpiece, center headstocks 31a and 31b are mounted facing one another at the ends of the corresponding supports.

The regulation of the longitudinal position of the model workpiece $g6$ is effected by the movement of the center 31b by means of the nut 32, the counter-center 31a being held against the end of the piece $g6$ during the regulation, by a spring 34.

The main advantage resulting from the possibility of using a model workpiece as template, at least for the finishing stage, is as follows: it is no longer necessary to have special machines available for the precision production of a plane template, since this model workpiece can be produced by using the copying lathe as a conventional manually controlled lathe, and this model workpiece, thus produced can then be used as an ordinary item of the series of workpieces reproduced from it.

The radial position of the supports is pre-regulated, for example with the aid of screws 33 screwed into the supports and bearing upon the cheeks 19. Then the supports are locked in position by clamps 35 and screws 37 which are shown in FIGURE 3.

This arrangement permits varying the distance between the axis of the shaft 3 and the point of action of the feeler 1 upon the template. Thus the value is regulated of the successive radii R1, R2, R3 etc. (FIGURE 2) of the effective profiles of the template-rules such as the straight rules of equal width $g1$, $g2$, $g3$ etc. used for the production of workpieces with cylindrical lengths, the value of the difference of two successive radii corresponding to the stage depth.

It is observed that the above-described template-holder is mounted in detachable fashion on the machine to which it is fitted and that consequently it is possible to effect a prior adjustment of the position of the templates on the template-holder away from the machine, which can thus continue to be used for other production during the preadjustment.

FIGURES 4 and 5 represent a template-holder intended to support only plane templates. In this case three cheeks 40 are fitted to the shaft 3. The cheeks 40 are keyed in correct angular position with the aid of pins 41 lodged in a channel 42. The cheeks 40 possess radial slots on their periphery, in with the plane templates $g1$ to $g6$ are fitted.

FIGURES 6 and 7 represent a template-holder intended to support three templates constituted by model workpieces.

Two cheeks 45 are fitted on to the shaft 3 and keyed angularly as stated above. The cheeks 45 comprise centers 46 disposed facing one another and between which model workpieces g1, g2 and g3 are held.

FIGURES 8 and 9 relate to similar embodiment, in the case where it is desired to use a larger number of model workpieces as templates. The same reference numbers designate the corresponding elements.

I claim:

1. In a machine of the type having a feeler operatively associated with a tool to control a machining operation of a workpiece, the provision of template holder means adapted for supporting a plurality of different templates each of which is adapted for successively cooperating with the feeler to control the tool, said template holder means comprising a shaft having an axis of rotation and adapted for rotation in step-by-step movement between angular positions respectively corresponding to successive machining stages of operation, at least two cheeks slidably supported on said shaft for rotation therewith and extending radially of the shaft, means for securing the cheeks to the shaft in axially adjusted positions, said cheeks having outside diameters substantially greater than that of the shaft, a plurality of templates being provided each of which corresponds to a different machining stage in orderly sequence, said templates having opposite ends, means supporting said templates at said ends thereof from said cheeks detachably and for adjustment in a direction radially of said shaft, and means for securing the ends of the templates individually in the respective cheeks in respective adjusted positions in the cheeks.

2. For a machine of the type having a feeler adapted to cooperate successively with a plurality of different machining templates for controlling successive machining operation of a workpiece in accordance with the shapes of the different templates, means for fixedly supporting said plurality of templates in adjustable manner relative to said tool, said means comprising a shaft adapted for rotation in step-by-step movements in which the templates successively are positioned for cooperating with the feeler for successive machining operation, at least two cheeks slidably supported on said shaft and rotatable with said shaft, said cheeks having outside diameters substantially greater than that of said shaft, and means for adjustably securing said templates in said cheeks with adjustment in a direction radially of said shaft individually in respective cheeks.

3. A machine of the type having a feeler adapted to cooperate successively with a plurality of machining templates for controlling successive machining of a workpiece in accordance with the shapes of different templates, said machine comprising a shaft adapted for rotation in step-by-step movements between successive angular positions respectively corresponding to a particular machining stage of operation, at least two cheeks supported on said shaft for rotation therewith and slidable along said shaft, means for securing the cheeks to the shaft in adjusted spaced relation on the shaft, said cheeks extending radially from said shaft and having a periphery with a diameter substantially greater than that of said shaft, a plurality of template supports detachably supported in the cheeks, and means fixedly supporting the template supports for adjustment in a direction radially of the shaft, said template supports being adapted for supporting the templates independently and individually such that said feeler is able to cooperate separately with the templates in succession to control the machining operations.

4. For a machine of the type having a feeler adapted to cooperate successively with a plurality of machining templates for controlling successive machining of a workpiece in accordance with the shapes of the different templates, means for supporting said plurality of templates in adjustable manner relative to said tool, said means comprising a shaft adapted for rotation in step-by-step movements between angular positions respectively corresponding to a particular machining stage of operation, at least two cheeks detachably supported on said shaft for rotation therewith and slidable along said shaft, said cheeks extending radially from said shaft and having a periphery with an outside diameter substantially greater than that of said shaft, said cheeks being provided with slots extending radially inward from said periphery, said slots being arranged angularly in said cheeks to respectively corespond to the position of said tool during the step-by-step rotation of said shaft, removable template supports slidably supported in said slots whereby the latter constitute slideways, means for individually and fixedly securing each template support in an adjusted position in a respective slideway, and means for supporting a template from a respective template support in detachable manner in each of the cheeks whereby each template spans a distance between the cheeks and is effective to cooperate with the feeler to control a specific machining operation.

References Cited by the Examiner
UNITED STATES PATENTS

| | | | |
|---|---|---|---|
| 302,644 | 7/84 | Albee | 142—5 |
| 550,401 | 11/95 | Aram | 142—8 |
| 571,901 | 11/96 | Heald | 82—14 |
| 2,645,148 | 7/53 | Zelewsky | 82—14 |

FOREIGN PATENTS 851,468  10/60  Great Britain.

WILLIAM W. DYER, Jr., *Primary Examiner.*
LEON PEAR, *Examiner.*